United States Patent
McGuire (10) Patent No.: US 6,934,944 B2
(45) Date of Patent: Aug. 23, 2005

(54) COMPUTER SYSTEM AND METHOD FOR CONSTANT POOL OPERATIONS

(75) Inventor: Richard Kenneth McGuire, Boston, MA (US)

(73) Assignee: International Business Machines Corporation, Armonk, NY (US)

(*) Notice: Subject to any disclaimer, the term of this patent is extended or adjusted under 35 U.S.C. 154(b) by 534 days.

(21) Appl. No.: 09/928,828

(22) Filed: Aug. 13, 2001

(65) Prior Publication Data

US 2003/0149966 A1 Aug. 7, 2003

(51) Int. Cl.[7] .................................................. G06F 9/44
(52) U.S. Cl. ....................... 717/165; 717/116; 717/118
(58) Field of Search .................................. 717/106, 108, 717/114, 116, 118, 139, 146, 162–166; 719/310, 328

(56) References Cited

U.S. PATENT DOCUMENTS 5,367,685 A * 11/1994 Gosling ...................... 717/148
5,966,702 A * 10/1999 Fresko et al. ................. 707/1
6,338,160 B1 * 1/2002 Patel et al. .................. 717/139

OTHER PUBLICATIONS

Author: Jon Meyer and Troy Downing Title: Java Virtual Machine Publisher: O'Reilly & Associates 1997, Sebastopol, California.

* cited by examiner

*Primary Examiner*—Antony Nguyen-Ba
(74) *Attorney, Agent, or Firm*—Stephen T. Keohane; Hoffman, Warnick & D'Alessandro LLC (57) ABSTRACT

A computer system has one or more program classes loaded in it. Each class includes a constant pool which is used for storing data items related to the program class. At least some of these data items need to undergo a resolution before they can be used, which transforms them from their initially loaded value into a usable value. In accordance with the invention, the system maintains both the unresolved value and the resolved value in the constant pool entry for a resolved data item. This allows the resolution process to be performed without using locks, thereby avoiding potential system delays due to contention for locks.

24 Claims, 6 Drawing Sheets

PRIOR ART

FIG 6

| TAG | FLAG | ORIGINAL DATA | RESOLVED DATA |
|-----|------|---------------|---------------|
| 702 | 703  | 704           | 705           |
|     |      |               |               |

FIG. 7

COMPUTER SYSTEM AND METHOD FOR CONSTANT POOL OPERATIONS

FIELD OF THE INVENTION

The present invention relates to computer systems having constant pools, and in particular to the resolution of entries therein.

BACKGROUND OF THE INVENTION

In the Java programming environment (Java is a trademark of Sun Microsystems Inc), programs are generally run on a virtual machine, rather than directly on hardware. Thus a Java program is typically compiled into byte-code form, and then interpreted by the Java virtual machine (VM) into hardware commands for the platform on which the Java VM is executing. The Java environment is further described in many books, for example "Exploring Java" by Niemeyer and Peck, O'Reilly & Associates, 1996, USA, "Java Virtual Machine", by Meyer and Downing, O'Reilly & Associates, 1997, USA, and "The Java Virtual Machine Specification" by Lindholm and Yellin, Addison-Wedley, 1997, USA.

Java is an object-oriented language. Thus a Java program is formed from a set of class files having methods that represent sequences of instructions. One Java object can call a method in another Java object. A hierarchy of classes can be defined, with each class inheriting properties (including methods) from those classes which are above it in the hierarchy. For any given class in the hierarchy, its descendants (i.e. below it) are called subclasses, whilst its ancestors (i.e. above it) are called superclasses. At run-time classes are loaded into the Java VM by one or more class loaders, which are themselves organised into a hierarchy. Objects can then be created as instantiations of these class files, and indeed the class files themselves are effectively loaded as objects.

A Java class file contains a table of information called the constant pool. The constant pool is a set of constant values referenced by the Java byte-code operators, and also by other elements within the class file. References to constant pool items are done by item index, with the first element in the constant pool getting index value 1. The constant pool index positions are assigned by the appearance order within the class file.

Some of the constant values from a class file need to undergo a transformation from the values extracted from the class file into the values required by the Java VM to execute Java methods. One example of this would be if the constant is a reference to another class, then this would need to be converted from the class name into the actual location of the class in the system. This transformation process is termed resolution, and includes checking that the item to be accessed exists (and if not, potentially loading or creating it), plus checking that access to the relevant item is permitted (e.g. it is not private data within another class). More details about the constant pool and resolution can be found in the above-mentioned book by Meyer and Downing.

The Java VM specification is flexible about the timing of resolution. It is permissible to aggressively resolve constant pool items at load time, providing that any resolution errors are deferred until a constant pool item is used the first time. However, most Java VM implementations employ a lazy resolution strategy, which defers resolution itself until the first use of a constant pool item. This is because lazy resolution strategies tend to have more efficient memory usage, since constants in infrequently used code paths (such as error message literals in error handling code) will only be resolved when (if) required.

To support the resolution process, the internal constant pool format needs to maintain information about the status of each of the constant pool items. The status information contains the constant pool type, as well as a marker flag to control the resolution status. If the flag is set, then this indicates that the corresponding entry in the constant pool has been resolved, thereby allowing its use by Java byte code operations (a constant pool item must be fully resolved before it can be used). Once a constant pool entry is marked as resolved, the entry becomes immutable. At this stage, the Java VM is free to employ optimisation strategies that bypass resolution checks for subsequent usage.

The Java language also supports multiple threads which can run concurrently. As in any concurrent system, it is important to be able to control access to shared resources, to avoid potential conflict between different threads as regards their usage of a particular resource. Java VM implementations of locking are generally based on the concept of monitors which can be associated with objects. A monitor can be used for example to exclusively lock a piece of code in an object associated with that monitor, so that only the thread that holds the lock for that object can run that piece of code—other threads will queue waiting for the lock to become free. The monitor can be used to control access to an object representing either a critical section of code or a resource. Controlling exclusive access to a particular object by Java programs is termed synchronisation.

Returning now to the constant pool, early Java VM implementations represented the constant pool array as a union of constant pool items (a union being a programming construct in the C language). An update to the constant pool therefore required testing of the resolution flag, de-referencing the original constant pool data to resolve the item, resolving the item, setting the new value into the constant pool, and updating the resolved flag to indicate the resolution as complete.

Unfortunately, this process is exposed to potential conflict between two or more threads, which may be utilising the same class simultaneously, and so needing to access the same class data. Thus if a first thread tries to resolve an entry, by acquiring the resolved value, it now needs to (i) set the resolved flag; and (ii) write the resolved value into the constant pool. However, if another thread comes along and tries to read the constant pool entry in-between operations (i) and (ii), it will think that the entry has been resolved according to the flag, when in fact this is not (yet) the case. Nor does reversing the order of operations (i) and (ii) assist, since in this case another thread coming along in-between the two operations will think that the entry has not been resolved, and try to resolve the resolved value, rather than the original entry. In either case an error will result.

To avoid the above conflict, early Java VM implementations protected the resolution process by monitors to ensure that valid information was used to resolve the constant pool item and to make sure that readers see only valid information (of course, once the item has been marked as resolved, the read barriers are no longer required). Effectively, the monitors locked out other threads from operations that needed to be performed atomically (the combination of steps (i) and (ii) above).

These prior art implementations typically used the object monitor of the class owning the constant pool to protect the constant pool data. This is a fairly granular locking mechanism that only blocks access to the object (class) getting updated. Unfortunately however, in Java this same monitor is used to protect synchronised static methods for that class.

In practice, it was found that the processing involving the resolution (which may be fairly involved) was prone to race conditions that would cause Java VM deadlock conditions. (Deadlock is where a cyclic chain of dependencies is created that prevents further processing; the simplest example is where thread A owns resource X, and waits on access to resource Y, whilst thread B owns resource Y, and is waiting on access to resource X, in which case neither thread is able to progress).

With the introduction of the Java 2 system (i.e. version 1.2 of the Java VM), the above implementation was replaced by a global monitor to protect constant pool updates. This single global monitor, which covers all the constant pools in the system, resolved the deadlocking problems, since owning this global monitor does not impact usage of synchronised static methods within a class. In addition, it protects against resolution conflict, since only a single thread can try to resolve a constant pool entry at a time.

Unfortunately however, this new approach is not without its own drawbacks. In particular, the use of a single monitor requires all class constant pool activity to be synchronised as a single resource, and this causes scalability problems. Thus in systems running large numbers of threads, especially a heavy multi-tasking application running on multiple processors, fairly heavy contention can occur on the single global monitor, which can impact overall performance. This is compounded by the fact that other subsystems of the Java VM that utilise the constant pool, such as the byte-code verifier and the Just In Time (JIT) compiler, also have to synchronise on the global monitor for access to any of the unresolved constants.

Such problems are exacerbated in the context of an extended Java VM, which allows class sharing between a set of multiple VMs (see "Building a Java virtual machine for server applications: the JVM on OS/390" by Dillenberger et al., IBM Systems Journal, Vol 39/1, January 2000). The idea behind such systems is that a class can be loaded into a single VM, and then accessed and utilised by multiple other VMs, thereby saving memory and start-up time. In such a configuration, there is only a single constant pool, and so the global monitor for constant pool updates will interrupt execution across the entire set of Java virtual machines.

A further problem that arises in a shared classes environment is that resolution updates to the constant pool are not termination safe. Thus a fault in any of the member virtual machines can leave a class constant pool in an inconsistent state, resulting in corruption of the entire set of virtual machines. It is difficult to recover from such error situations, because the resolution mechanism loses information originally read from the class file.

SUMMARY OF THE INVENTION

Accordingly the invention provides a method of operating a computer system having one or more program classes loaded therein, said method comprising the steps of:

providing a constant pool for storing data items related to a program class;

performing a resolution on at least some of the data items in the constant pool, said resolution transforming a data item from an unresolved value as loaded to a resolved value such that the data item can be utilised by a program; and maintaining both the unresolved value and the resolved value in the constant pool entry for a resolved data item.

This approach is to be contrasted with that of the prior art, in which the resolved value overwrites the unresolved value in a single field. In the preferred embodiment, a resolution flag is provided for a data item, and this is set after that data item has been resolved. This allows users of the constant pool to determine whether to use the unresolved value (flag not set), or the resolved value (flag set).

In the preferred embodiment, the step of performing a resolution for a data item comprises the steps of: retrieving the unresolved value of the data item; determining the resolved value of the data item; and writing the resolved value of the data item into the constant pool, whilst still maintaining the unresolved value of the data item in the constant pool. Note that these steps are performed without locking the constant pool or any component thereof. This is possible because resolution by different threads will result in the same outcome (resolved value). Hence, even if different processes concurrently attempt to perform resolution, there will be no conflict or inconsistency in the end result. This is to be contrasted with the prior art approach, where locking was needed to prevent concurrent updates, since overwriting the original (unresolved value) and setting the resolution flag (to indicate whether the contents of the constant pool should be interpreted as the original or resolved value) needed to be performed atomically.

This avoidance of locking clearly helps to improve efficiency, since prior art systems could suffer from delays caused by contention for the constant pool global lock. In particular, scalability is helped, since large systems are particularly vulnerable to having to queue on a single (global) lock, which can become a bottleneck when many threads are progressing simultaneously.

In the preferred embodiment, the program classes are loaded into a Java virtual machine which includes said constant pool. Note that in a Java environment, the constant pool is also accessed to determine the name of a corresponding class. In accordance with the present invention, where a data item within a constant pool has as its unresolved value an index to the name of a class, the method further comprises the step of always accessing said unresolved value to obtain the class name, irrespective of whether said resolution flag has been set. Again this approach avoids the need for locking, because the unresolved value is maintained, and therefore guaranteed to always provide a correct index.

In one preferred implementation, the computer system supports a configuration of shared Java virtual machines, such that data items in the constant pool in one Java virtual machine can be resolved in response to processing in another Java virtual machine. The approach described herein is particularly advantageous in such a configuration. Firstly, related to scalability, it avoids processes on one machine potentially having to queue for the constant pool global lock owned by a process on another machine, but rather allows these processes to proceed with their independent resolution. Secondly, the approach is robust against system termination during resolution, since the constant pool cannot be left in an invalid state (assuming that the machine supporting the constant pool itself is functioning properly). Thus the last operation in the resolution process is to set the resolution flag. If the resolution process terminates erroneously before this point, then other processes can still use the original (unresolved) data, which remains valid and available for use.

The invention further provides a computer system having one or more program classes loaded therein, and further comprising:

a constant pool for storing data items related to a program class;

means for performing a resolution on at least some of the data items in the constant pool, said resolution transforming a data item from an unresolved value as loaded to a resolved value such that the data item can be utilised by a program;

wherein said constant pool includes fields for maintaining both the unresolved value and the resolved value in the constant pool entry for a resolved data item.

The invention further provides a computer program product comprising instructions encoded on a computer readable medium for causing a computer to perform the methods described above. A suitable computer readable medium may be a DVD or computer disk, or the instructions may be encoded in a signal transmitted over a network from a server. These instructions can then be loaded into memory (e.g. RAM) of a computer system, for execution by a processor to implement the relevant methods. It will be appreciated that the computer system and program product of the invention will generally benefit from the same preferred features as the method of the invention.

BRIEF DESCRIPTION OF THE DRAWINGS

A preferred embodiment of the invention will now be described in detail by way of example only with reference to the following drawings.

DETAILED DESCRIPTION OF A PREFERRED EMBODIMENT

Figure 1:
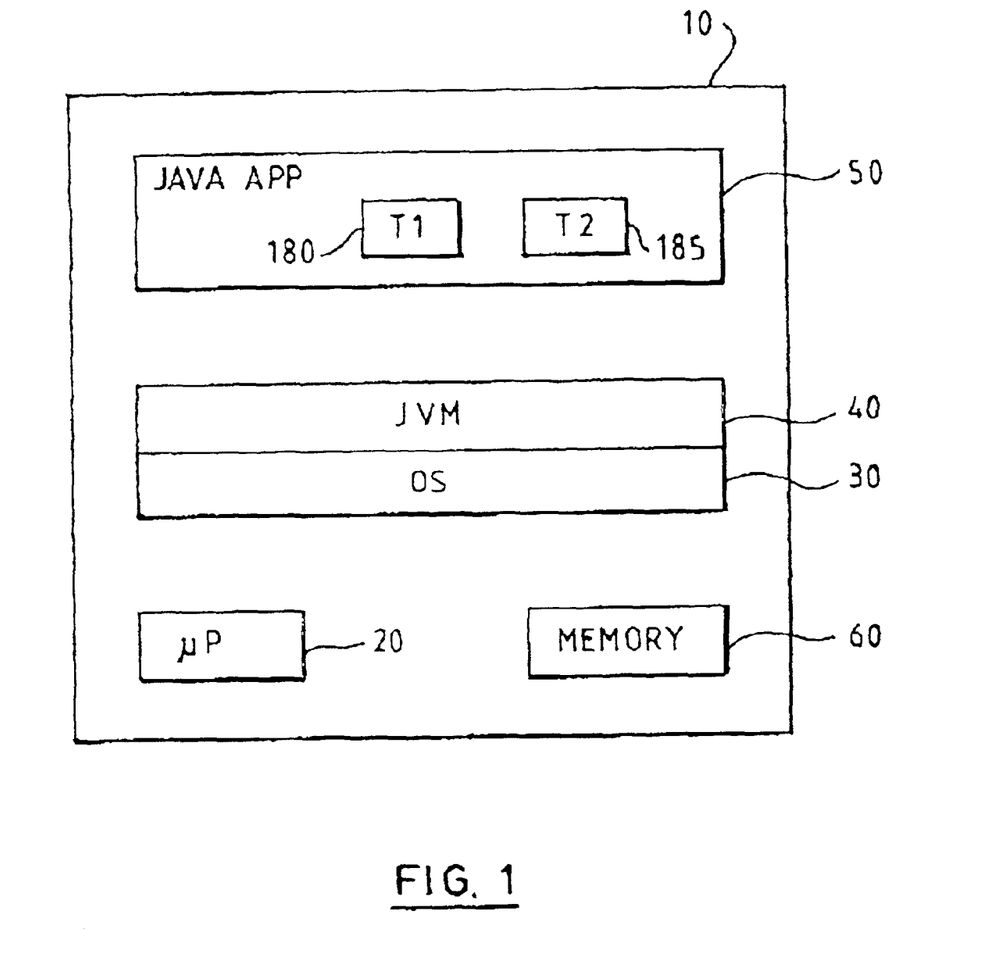
FIG. 1 is a schematic drawing of a computer system supporting a Java virtual machine (VM)

FIG. 1 illustrates a computer system 10 including a (micro)processor 20 which is used to run software loaded into memory 60. The software can be loaded into the memory by various means (not shown), for example from a removable storage device such as a floppy disk or CD ROM, or over a network such as a local area network (LAN) or telephone/modem (wired or wireless) connection, typically via a hard disk drive (also not shown). Computer system 10 runs an operating system (OS) 30, on top of which is provided a Java virtual machine (VM) 40. The Java VM 40 looks like an application to the (native) OS 30, but in fact functions itself as a virtual operating system, supporting Java application 50, which potentially includes multiple threads, e.g. T1 180 and T2 185.

It will be appreciated that computer system 10 can be a standard personal computer or workstation, minicomputer, mainframe, palmtop, or any other suitable computing device, and will typically include many other components (not shown) such as display screen, keyboard, sound card, network adapter card, etc. which are not directly relevant to an understanding of the present invention. Note that computer system 10 may also be an embedded system, such as a set top box, or any other hardware device including a processor 20 and control software 30, 40.

Figure 2:
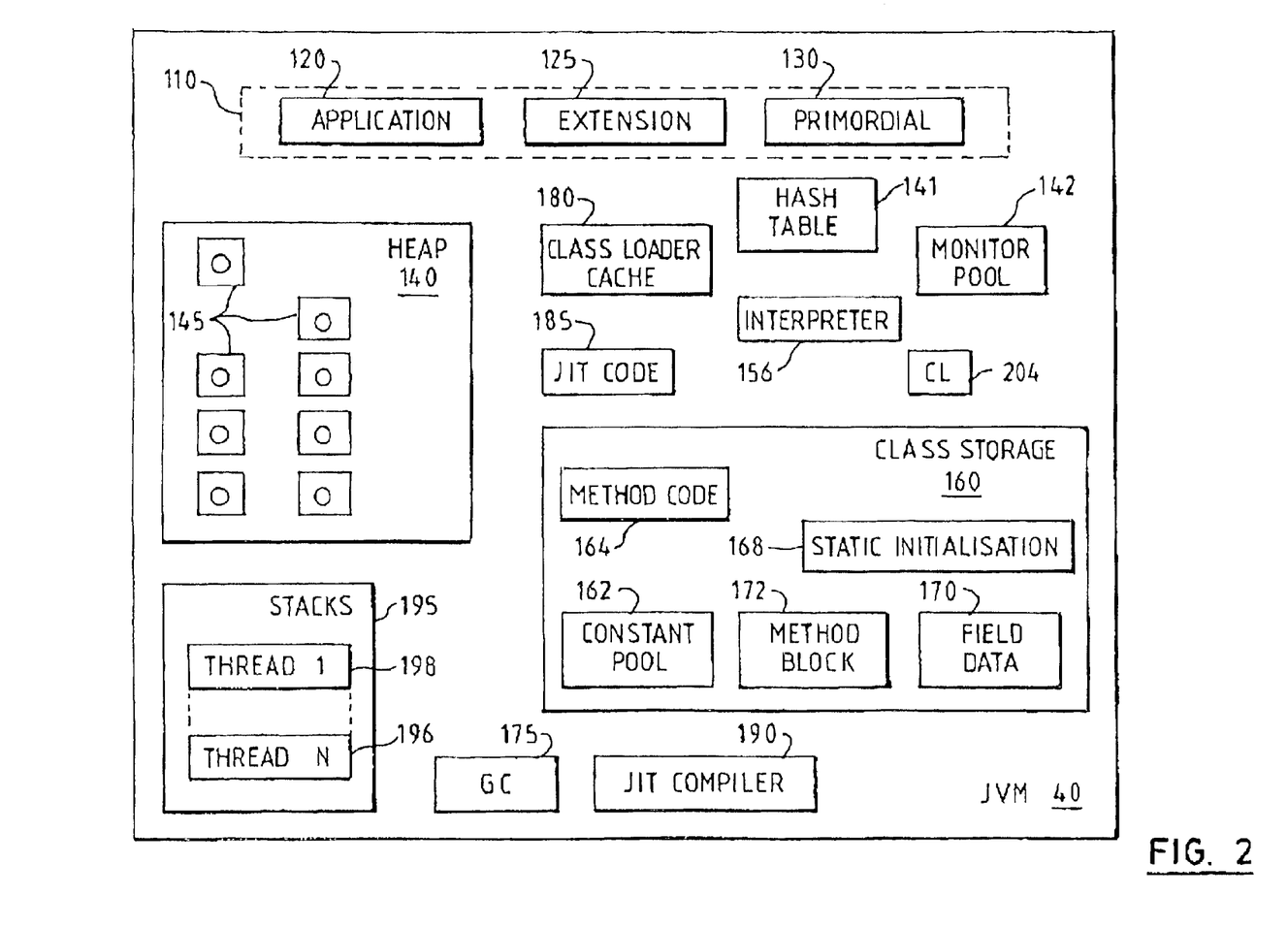
FIG. 2 is a schematic diagram showing the Java VM in more detail.

FIG. 2 shows the structure of Java VM 40 in more detail (omitting some components which are not directly pertinent to an understanding of the present invention). The fundamental unit of a Java program is the class, and thus in order to run any application the Java VM must first load the classes forming and required by that application. For this purpose the Java VM includes a hierarchy of class loaders 110, which conventionally includes three particular class loaders, named Application 120, Extension 125, and Primordial 130. The Java VM further includes a component CL 204, which also represents a class loader unit, but at a lower level. In other words, this is the component that actually interacts with the operating system to perform the class loading on behalf of the different (Java) class loaders 110.

Also present in the Java VM is a heap 140, which is used for storage of objects 145. Each loaded class represents an object, and therefore can be found on the heap. In Java a class effectively defines a type of object, and this is then instantiated one or more times in order to utilise the object. Each such instance is itself an object which can be found in heap 140. Thus the objects 145 shown in the heap in FIG. 2 may represent class objects or other object instances. (Note that strictly the class loaders as objects are also stored on heap 140, although for the sake of clarity they are shown separately in FIG. 2).

The Java VM also includes a class storage area 160, which is used for storing information relating to the class files stored as objects in the heap 140. This area includes the method code region 164 for storing byte code for implementing class method calls, and a constant pool 162 for storing strings and other constants associated with a class. The class storage area also includes a field data region 170 for sharing static variables (static in this case implies belonging to the class rather than individual instances of the class, or, to put this another way, shared between all instances of a class), and an area 168 for storing static initialisation methods and other specialised methods (separate from the main method code 164). The class storage area further includes a method block area 172, which is used to store information relating to the code, such as invokers, and a pointer to the code, which may for example be in method code area 164, in JIT code area 185 (as described in more detail below), or loaded as native code such as C, for example as a dynamic link library (DLL).

Classes stored as objects 145 in the heap 140 contain a reference to their associated data such as method byte code etc. in class storage area 160. They also contain a reference to the class loader which loaded them into the heap, plus other fields such as a flag (not shown) to indicate whether or not they have been initialised.

FIG. 2 further shows a monitor pool 142. This contains a set of locks (monitors) that are used to control access to an object by different threads. Thus when a thread requires exclusive access to an object, it first obtains ownership of its corresponding monitor. Each monitor can maintain a queue of threads waiting for access to any particular object. Hash table 141 is used to map from an object in the heap to its associated monitor.

Another component of the Java VM is the interpreter 156, which is responsible for reading in Java byte code from loaded classes, and converting this into machine instructions for the relevant platform. From the perspective of a Java application, the interpreter effectively simulates the operation of a processor for the virtual machine.

Also included within the Java VM are class loader cache 180 and garbage collection (GC) unit 175. The former is a table used to allow a class loader to trace those classes which it initially loaded into the Java VM. The class loader cache therefore permits each class loader to check whether it has loaded a particular class. Note also that it is part of the overall security policy of the Java VM that classes will typically have different levels of permission within the system based on the identity of the class loader by which they were originally loaded. Garbage collection (GC) facility 175 is used to delete objects from heap 140 when those objects are no longer required.

The Java VM further includes a just-in-time (JIT) compiler 190. This forms machine code to run directly on the native platform by a compilation process from the class files. The machine code is created typically when the application program is started up or when some other usage criterion is met, and is then stored for future use. This improves run-time performance by avoiding the need for this code to be interpreted later (perhaps repeatedly) by the interpreter 156.

Another component of the Java VM is the stack area 195, which is used for storing the stacks 196, 198 associated with the execution of different threads on the Java VM. Note that because the system libraries and indeed parts of the Java VM itself are written in Java, and these frequently use multithreading, the Java VM may be supporting multiple threads even if the user application 50 running on top of the Java VM contains only a single thread itself.

It will be appreciated of course that FIG. 2 is simplified, and omits many components not directly relevant to an understanding of the present invention. Thus for example the heap may contain thousands of Java objects in order to run Java application 50, and the Java VM typically contains many other units (not shown) such as diagnostic facilities, etc.

Considering now the constant pool 162 in more detail, items within the constant pool have tagged data types, representing different types of data. The possible constant pool types are listed in Table 1.

TABLE 1

| | |
|---|---|
| Integer | An integer value constant. This is used for all Java constants of type int, short, char, byte, and boolean. |
| Float | A floating point constant. This maps to the Java float primitive type. |
| Double | A double floating point constant. This maps to the Java double primitive type. Double constants occupy two index positions in the constant pool, which allows the constant pool to be implemented as a simple array of single size slots |
| Long | A long integer constant. This maps to the Java long primitive type. Like Double constants, Long constant values occupy two slot positions. |
| Utf8 | A string constant in UTF8 encoding. All string values used in a class file are referenced using Utf8 constant pool items. This include literal string values, class names, field names, method names, field and method signatures, and named attributes within a class file. Many of the other constant pool types are indirect references to Utf8 entries when initially read from the class file. |
| String | A Java constant of the type java.lang.String. These are used for Java literal string constants (e.g., "abc"). |
| Class | A reference to a class object used by this class. Class references are used for many types of operations, including the superclass, interface classes referenced by this class, exception classes thrown by a method (or caught by a method), field classes, classes used for cast operations, classes that own methods called by this class, and classes that own fields referenced by this class. |

TABLE 1-continued

| | |
|---|---|
| MethodRef | A reference to a method called by this class. The MethodRefs may refer to the same class, or cross the boundaries as references to other classes. All MethodRef items will have a Class constant pool item that anchors the owing class (which may be shared with multiple MethodRef items). |
| InterfaceMethodRef | Similar to MethodRef, but restricted to being a method defined by an interface class. |
| FieldRef | A reference to a field accessed by this class. The field may be either a static or instance field, and may also be one defined by another class. Like MethodRef and InterfaceMethodRef constants, FieldRef constants are also linked to a Class constant entry for the class that owns the field. |
| NameAndType | A special constant entry for defining the name and signature strings for method and field identifiers. A NameAndType entry contains a pair of indirect references to Utf8 constant pool entries. |

As previously mentioned, entries in the constant pool must be resolved before they can be used. Note that the Integer, Float, Double, Long, Utf8, and NameAndType constants are already in their final forms when read from the class file, and can immediately be marked as resolved. The rest of the constant types need an additional resolution step to be made functional. The resolvable constants, and the steps required for resolution are listed in Table 2.

TABLE 2

| | |
|---|---|
| String | The initial constant pool data is the index of a Utf8 item containing the string constant value. Resolution converts this Utf8 item into an instance of the java.lang.String class, and updates the constant pool to be a direct reference to the string object. |
| Class | The initial constant pool data is the index of a Utf8 item containing the name of the referenced class. This name is passed to the class loading subsystem to resolve the appropriate class object. If a class is found, this item is updated to be a direct reference to the class object. |
| MethodRef | The initial constant pool data is the index of a Class constant pool item defining the owning class, and a NameAndType item that defines the method name and type signature. Resolving a MethodRef item requires first successfully resolving the indirectly referenced Class item. If a matching method is found, the constant pool item is updated to point to the descriptive information for the method. |
| InterfaceMethodRef | Similar to MethodRef items. |
| FieldRef | Similar to MethodRef items. |

An example of the use of resolution is when Java code calls a method. In this situation the Java byte-code to invoke the method contains the index of the constant pool item that describes the method to be invoked. In its unresolved state, this item contains a pair of indices for other constant pool entries: 1) the class that owns the method, and 2) a second entry that defines the method name and signature. The class entry may itself need resolution, and once that is done, the name and signature are used to search for the target method, eventually resolving the method entry.

Figure 3:
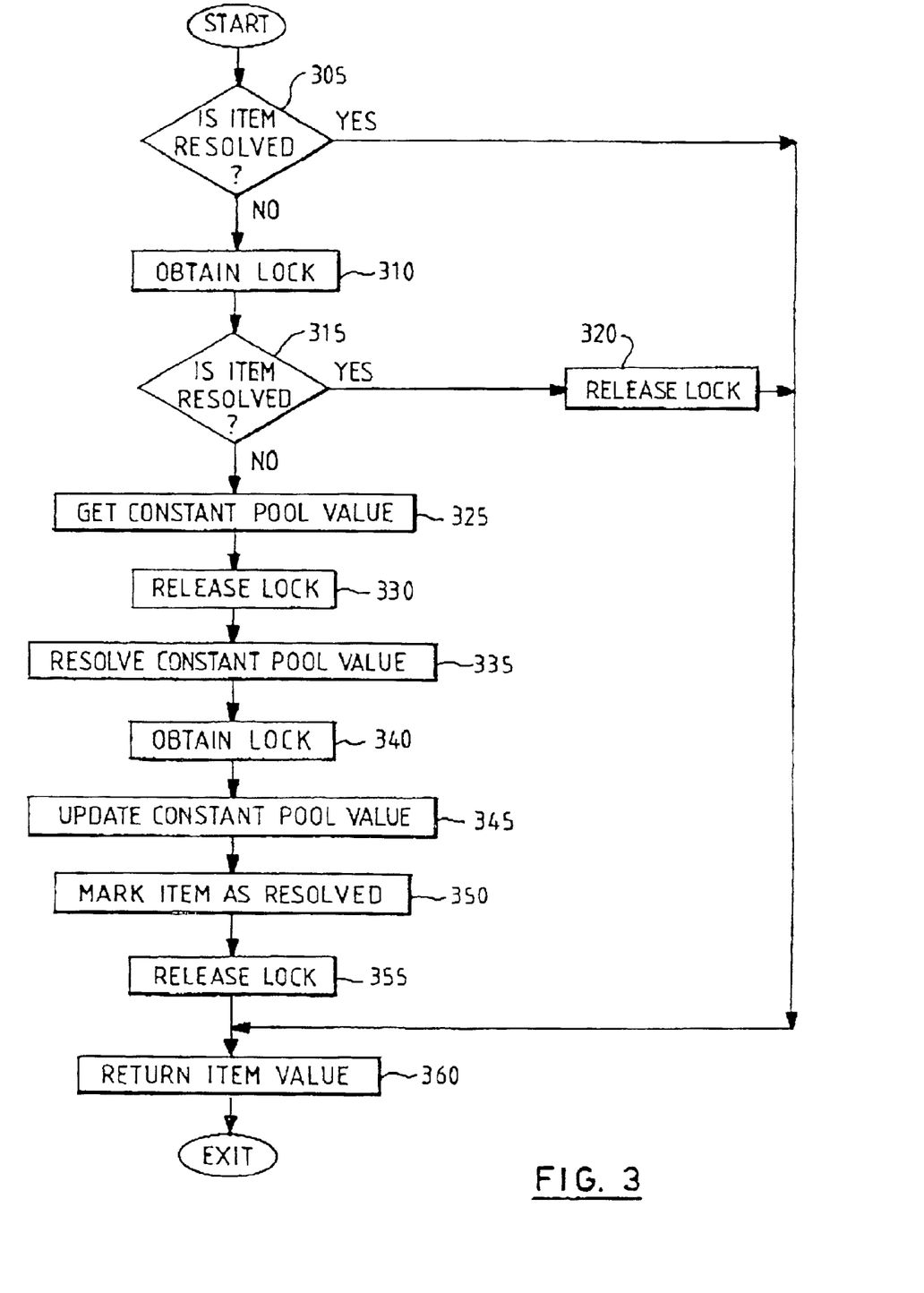
FIG. 3 is a flowchart illustrating a prior art resolution process.

FIG. 3 illustrates a prior art resolution process, as adopted in the Java 2 VM. This method starts with a thread checking the resolution flag (step 305) to see if the desired item in the constant pool has already been resolved. If so, the relevant item value can be returned immediately (step 360), and the process exits.

On the other hand, if the item is not yet resolved at step 305, then the global lock is obtained (step 310) that protects the constant pool for all loaded classes. Once ownership of the lock has been acquired, a further test is made to see if the item has been resolved already (step 315), just in case the item was resolved by another thread concurrent with step 310 (i.e. whilst the current process was waiting to acquire the lock). If the outcome of step 315 is positive, then the lock can be released (step 320), and the resolved item value returned (step 360), after which the process exits.

However, assuming at step 315 that the item is still unresolved, then the current process must itself resolve the constant pool entry. To do this, it accesses the value to be resolved (step 325) and then it releases the lock (step 330). The method now proceeds to perform the actual resolution (step 335). Next the lock is reacquired (step 340) to allows the constant pool entry to be updated with the resolved value (step 345), and the resolved flag set accordingly (step 350). The lock can now be finally released (step 355), and the item value returned (step 360), before the method exits.

In algorithmic form we can express the processing of FIG. 3 as:

```
if (item is resolved) {
    return item value
}
else {
    obtain global lock
    if (item is resolved) {
        release global lock
        return item value
    }
    get original constant pool information from item
    release global lock
    resolve constant pool value
    obtain global lock
    update constant pool value
    mark item as resolved
    release global lock
    return item value
}
```

It will be appreciated that the reason for releasing the lock in step 330 and then reacquiring it at step 340 is that the process of resolution (step 335) may be quite time-consuming (e.g. it may involve loading a class) or require locking of additional resources that may possibly result in deadlock situation. Releasing the lock for the duration of step 335 therefore allows other constant pool updates to be performed concurrent with this step. Note that such updates may include resolution of the very same constant pool item that the current process is attempting to resolve. In theory therefore, one could test immediately after step 340 to see if the constant pool item had been resolved whilst the lock had been released (i.e. between steps 330 and 340). However, since resolution of a constant pool item should always give the same value, then it is quicker to update the constant pool value and resolution flags (steps 345 and 350) than to now test to see if this has already been done; even if the item has already been resolved, all that would happen in steps 345 and 350 is the existing resolved values would be overwritten with the newly derived (and hopefully identical) values.

As previously indicated, the prior art implementation of FIG. 3 suffers from poor scalability as a result of the global locking. This can be remedied by the resolution process illustrated in FIG. 4, in accordance with a preferred embodiment of the invention. Note that in order to support the process of FIG. 4, the constant pool is augmented by an additional data field for each item in the constant pool. Thus in the prior art, a single field is used to store a data item to be resolved, and then this is overwritten by the corresponding resolved value. In contrast, in a system in accordance with the present invention, this single field is replaced by two fields, the first of which is used to store the data item to be resolved, and the second to store the resolved value (when available).

Figure 4:
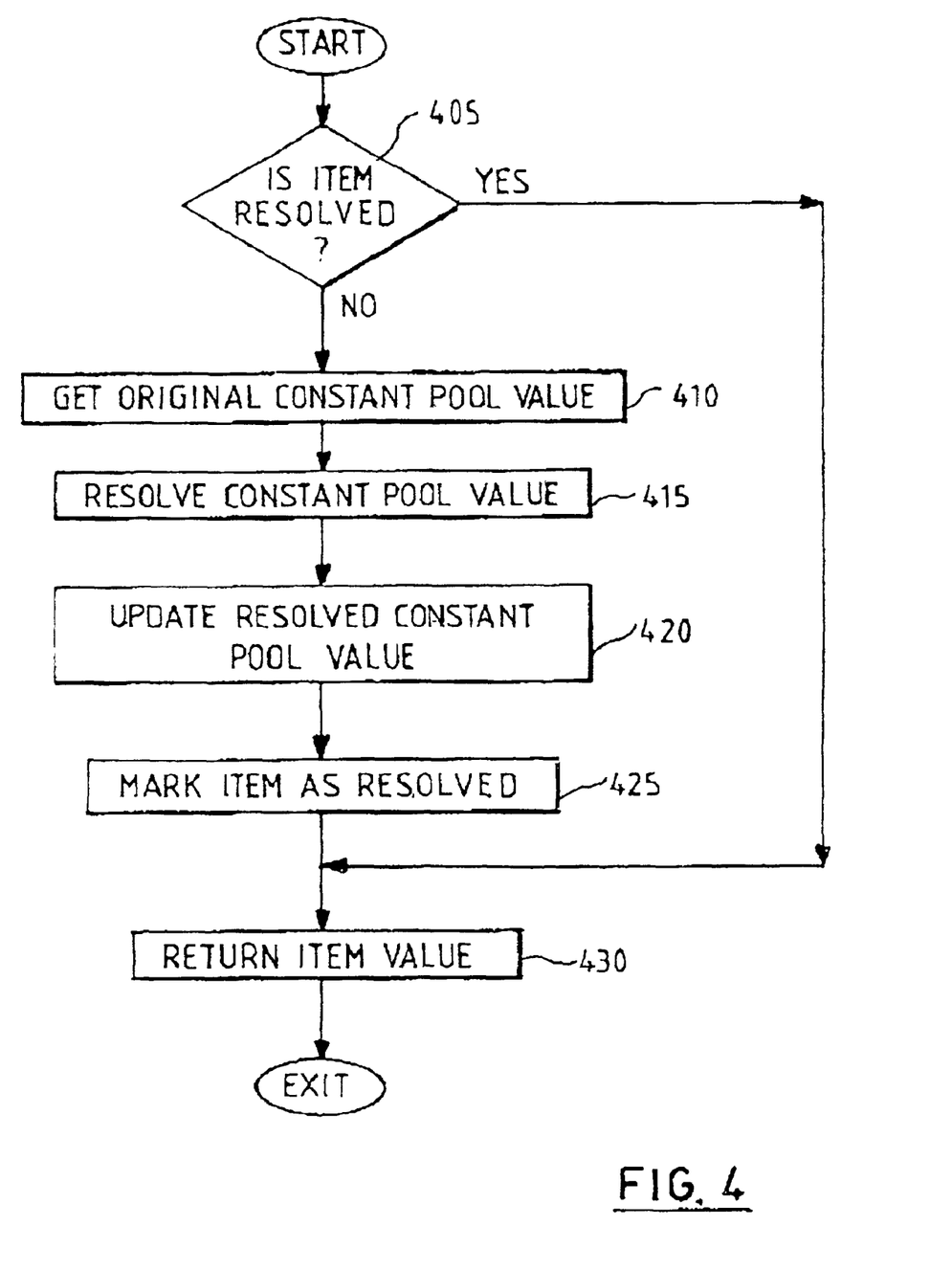
FIG. 4 is a flowchart illustrating a resolution in accordance with a preferred embodiment of the present invention.

Considering now the processing of FIG. 4, this commences in the same manner as FIG. 3, with a test to see if the desired constant pool item has already been resolved (step 405); if so the method can return the resolved value directly (step 430) and then exit. Note that the resolved item value is always obtained from the second data field mentioned above (the one used for storing resolved data).

Assuming however that the item is not already resolved, the method proceeds to step 410, in which the original constant pool value is obtained (step 410). Note that this retrieval is from the first data field mentioned above (the one used for storing unresolved data). The constant pool item can now be resolved (step 415), and the answer written into the second data field for resolved data (step 420). The item is now marked as resolved (step 425), and the resolved data item can be returned (step 430), whereupon the method exits.

The process of FIG. 4 is safe against conflict with other threads. For example, if another thread tries to read the data item, then it will only appear resolved (according to the marker flag) after step 425, at which point the correct resolved data has indeed been stored (step 420). On the other hand, if a read is attempted prior to step 425, then the data item will appear unresolved, and the relevant process will have to perform its own resolution.

Now considering if another thread does perform its own resolution, and then writes the results back to the constant pool, then again this cannot conflict with the processing of FIG. 4. Firstly, such writing will never impact the saved original (unresolved) data item value, as retrieved in step 410, since the two different fields are used for resolved and unresolved data items. Secondly, as previously mentioned, resolution by any thread should always lead to the same result. Accordingly, even if another thread updates the resolved data value and resolution flag in-between step 405 and step 420/425, there is no inconsistency, since this will simply overwrite the resolved value with itself again.

In other words, because the process of resolving a constant value will produce the same value in all threads resolving the entry, it is possible to allow all threads to attempt to update the constant pool. Indeed, as previously mentioned, this already happens in the processing of FIG. 3, because the process of resolving the item is not synchronised with the global monitor, only the final update. However, in the processing of FIG. 4, since the value in the resolved field will not be used until the first thread updates the resolved status of the constant pool item, it is possible to safely allow multiple threads (or even processes in a shared Java VM environment) to update the constant pool without using monitors.

In algorithmic form, the processing of FIG. 4 can be expressed as:

```
if (item is not resolved) {
    get original constant data from saved data
    resolved constant pool value
    update resolved version of the constant pool
    information
    mark item as resolved
}
return item value from resolved field.
```

The constant pool can also be accessed by certain system processes, in particular the JIT and also the byte code verifier (used when loading a class) to obtain the name of a referenced class, method or field. Note that such access may occur before or after resolution, and by itself does not trigger resolution (it does not count as first use of the relevant item, as per the Java VM specification).

Figure 5:
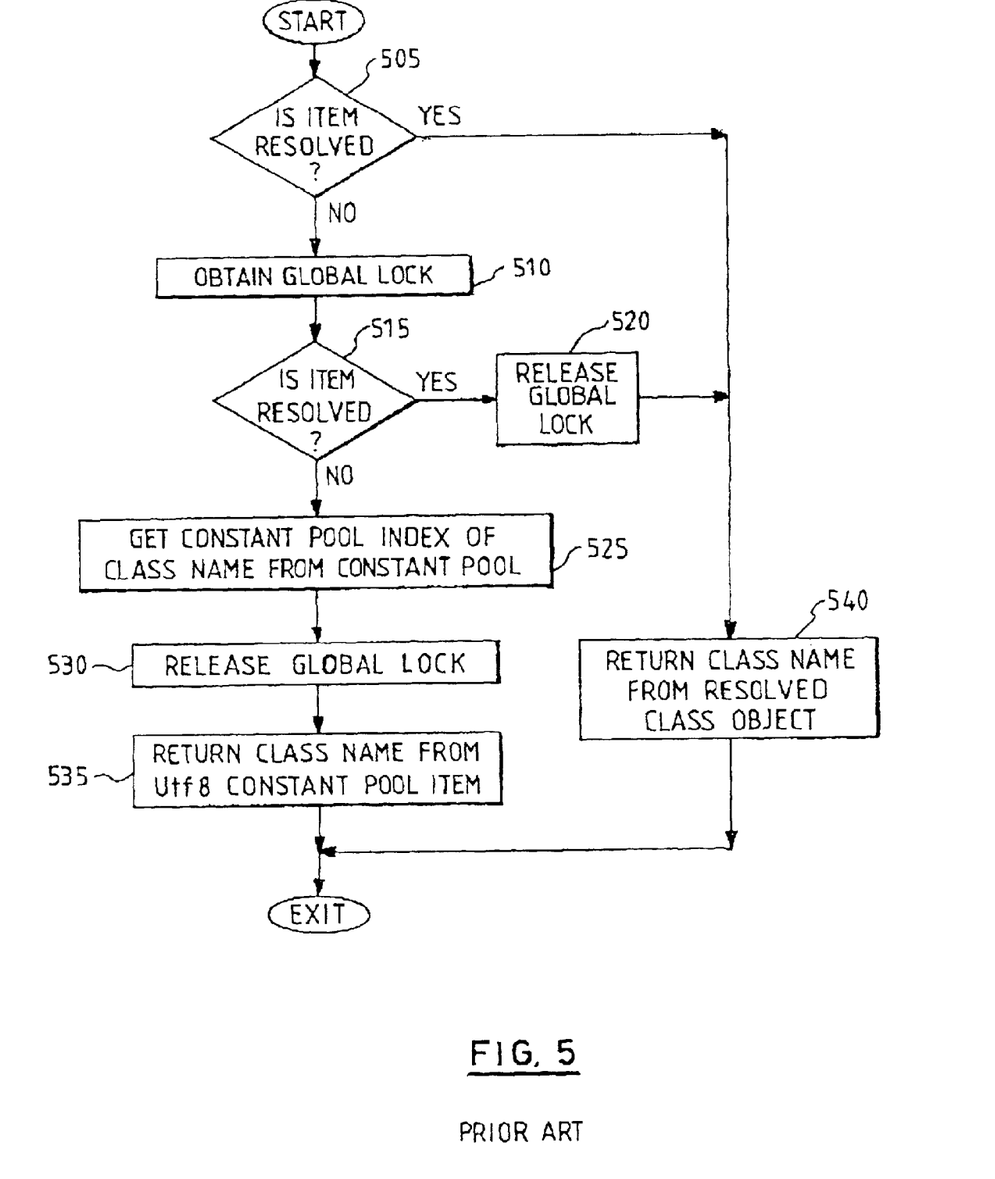
FIG. 5 is a flowchart illustrating a prior art process for obtaining a class name from the constant pool.

The prior art process whereby the class name could be obtained is illustrated in the flowchart of FIG. 5. This operation is predicated on the information contained in Table 2, namely that a class item in the constant pool initially contains the index of a Utf8 item containing the name of the referenced class. In order to resolve this item, the Utf8 value is passed to the class loading subsystem. If the class is found, then the item in the constant pool can be updated to become a direct reference to the class object.

In the process of FIG. 5, an initial test is made to see if the class item has been resolved (step 505); if so, the resolved class name can be returned directly from the constant pool (step 540). On the other hand, if the test of step 505 is negative, then the system must acquire the global lock (step 510) and test again to see if the class item has been resolved. The repeat test is necessary, as in the process of FIG. 3, in case the class item was resolved by another thread whilst the current process was waiting for the global lock. If the class item has by now been resolved, then the global lock can be released (step 520), and the resolved class name returned (step 540). On the other hand, if the item is still not resolved (a negative outcome at step 515), then the index to the constant pool item containing the Utf8 class name is obtained (step 525). The global lock can now be released (step 530), and the class name returned from the Utf8 constant pool item (step 535) identified by the index, whereupon the method exits.

Note that the lock must be held through the combination of steps 515 and 525 to ensure that the class item is not resolved by another thread in-between these two steps (if this did happen the class item obtained in step 525 would no longer correctly index the Utf8 constant pool item).

The flowchart of FIG. 5 can be represented in algorithmic form as follows:

```
if (item is resolved) {
    return class name from resolved class object
}
else {
    obtain global lock
    if (item is resolved) {
        release global lock
        return class name from resolved class object
    }
    else {
        get constant pool index of class name from
constant pool
        release global lock
        return class name from Utf8 constant pool item
    }
}
```

Figure 6:
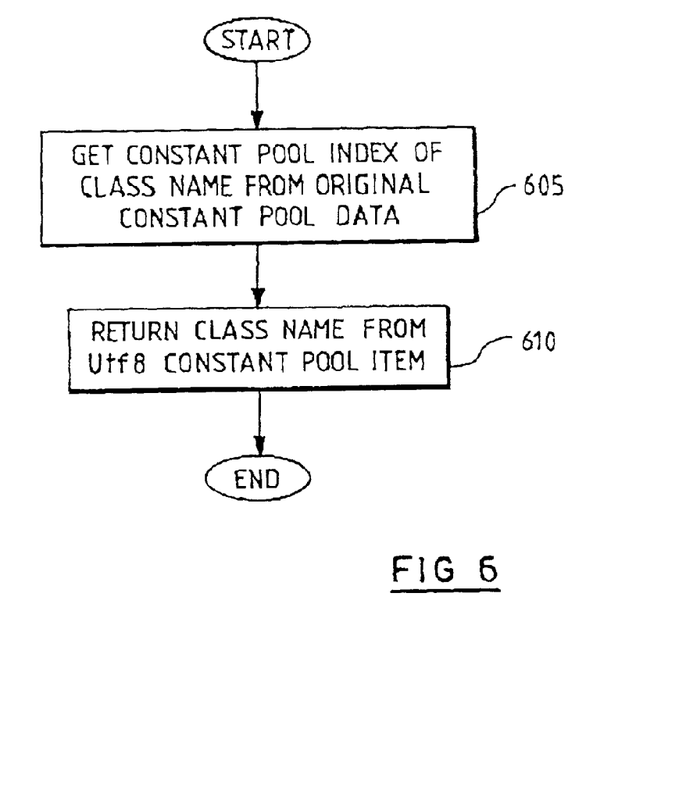
FIG. 6 is a flowchart illustrating a process for obtaining a class name from the constant pool in accordance with a preferred embodiment of the present invention.

In contrast to the above approach, FIG. 6 illustrates a way to determine the name of a class item from the constant pool in accordance with the present invention. This is very straightforward, and involves firstly obtaining the constant pool index of the class name from the original constant pool data (step 605), and then using this index to obtain and return the value of the indexed Utf8 constant pool item (step 610).

This approach exploits the fact that in accordance with the present invention, the original (unresolved) value of the constant pool item is retained, and so can always be used to index to the class name. Since this original value is never overwritten by the resolved class reference, the index remains valid throughout. In other words, the non-locking approach of the present invention maintains the original mapping of the constant pool item to the Utf8 item defining the class name, so that components such as the JIT and the bytecode verifier are able to access this information without worrying about whether the item has been updated, nor having to prevent an update while extracting the information. Accordingly, the method shown in FIG. 6 can dispense with all locking.

Figure 7:
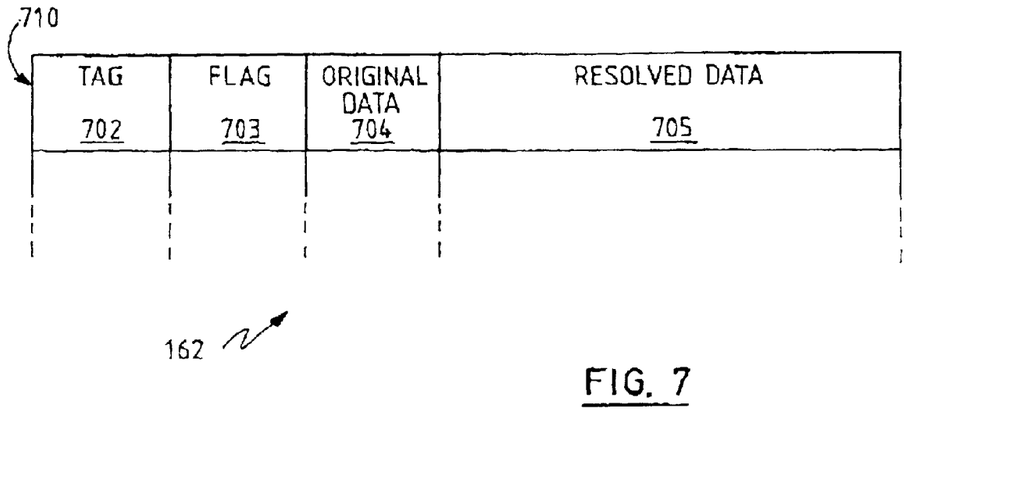
FIG. 7 is a schematic diagram illustrating in simplified form the format of entries in the constant pool.

The process of FIG. 6 can be represented in algorithmic form as follows:

get constant pool index of class name from original
  constant pool data
return class name from Utf8 constant pool item FIG. 7 illustrates the constant pool 162 in simplified schematic form in a preferred embodiment of the present invention, and in particular one entry 710 in the constant pool. This entry comprises four fields. The first is a tag 702, which indicates the type of data in the constant pool (see the list of various types as per Table 1 above). The second field is the resolution flag 703, which indicates whether or not the entry has been resolved. The third field 704 represents the original (unresolved) value of the data item, whilst the fourth and last field 705 represents the resolved value of the data item. For example, if the type of data as defined in field 702 is Class, then field 704 represents the index of a Utf8 item containing the name of the referenced class value, and field 705 (after resolution) contains a direct reference to the loaded class object.

It will be appreciated that the constant pool is a heterogeneous array, in that different types of data item in the constant pool will have different fields (both in terms of number and size) from that shown in FIG. 7. For instance, if entry 710 corresponded to a MethodRef data item (see Tables 1 and 2 above), then the original data value 704 would comprise two fields, the first an index to a Class constant pool entry defining the owning class, and the second an index to a NameandType item that defines the method name and type signature. More information about the structure of constant pools can be found in the above-mentioned book by Meyer and Downing.

Compared to prior art lazy resolution mechanisms, the constant pool operations as described herein provide the following advantages:

1. Improved scalability. Because updates can be made in a thread-safe fashion, it is not necessary to protect the item with a monitor that blocks similar activity across a virtual machine. This advantage is particularly important in an environment where classes are shared across multiple Java VMs. The need to lock a constant pool from updates in multiple virtual machines exacerbates the scalability problems of the traditional lazy update mechanism. In that environment, all virtual machines are prevented from constant pool updates when any member of the set needs to update a constant pool item. In accordance with the present invention, the need for both the read and the update barriers is eliminated, and the multiple virtual machines can operate independently of one other.

2. Improved performance and simplified code for the subsystems (e.g. the JIT) that need access to original information from the constant pool. These subsystems only require a single form of access to the data, and the non-granular monitor protection is again eliminated.

3. Improved reliability in a shared classes environment. Because the resolved constant pool item is not used until the final step of marking the item as resolved, it is not possible to interrupt execution in a way that leaves the constant pool in an unusable state. Since none of the original class file information is lost, an interrupted resolution can always be completed by another member of the Java VM set.

It will be appreciated that the although the invention has been described primarily with respect to the Java virtual machine, and the constant pool therein, it applies to other languages and environments which have constant pools or similar constructs containing data items for resolution.

What is claimed is:

1. A method of operating a computer system having one or more program classes loaded therein, said method comprising the steps of:
   providing a constant pool having constant pool entries for storing data items related to a program class;
   performing a resolution on at least some of the data items in the constant pool, said resolution transforming a data item from an unresolved value as loaded constant pool entry to a resolved value such that the data item can be utilised by a program; and
   maintaining both the unresolved value and the resolved value in the constant pool entry for the data item, wherein the constant pool entry has an unresolved value field for maintaining the unresolved value and a resolved value field for maintaining the resolved value.

2. The method of claim 1, further comprising the step of setting a resolution flag for a data item after that data item has been resolved.

3. The method of claim 2, wherein a data item within a constant pool has as its unresolved value an index to the name of a class, and said method further comprises the step of always accessing said unresolved value to obtain the class name, irrespective of whether said resolution flag has been set.

4. The method of claim 1, wherein the step of performing a resolution for a data item comprises the steps of:
   retrieving the unresolved value of the data item;
   determining the resolved value of the data item; and
   writing the resolved value of the data item into the constant pool entry, whilst still maintaining the unresolved value of the data item in the constant pool entry.

5. The method of claim 4, wherein the steps of retrieving, determining and writing are performed without locking the constant pool or any component thereof.

6. The method of claim 4, wherein the step of performing a resolution for a data item further comprises the step of setting a resolution flag for a data item after the resolved value of that data item has been written into the constant pool entry.

7. The method of claim 1, wherein said program classes are loaded into a bytecode environment which includes said constant pool.

8. The method of claim 7, wherein the computer system supports a configuration of shared bytecode environments, such that data items in the constant pool in one bytecode environment can be resolved in response to processing in another bytecode environment.

9. A computer system having one or more program classes loaded therein, and further comprising:
   a constant pool in memory, the constant pool having constant cool entries for storing data items related to a program class;
   means for performing a resolution on at least some of the data items in the constant pool, said resolution transforming a data item in a constant pool entry from an unresolved value as loaded to a resolved value such that the data item can be utilised by a program; and
   means for maintaining both the unresolved value and the resolved value in the constant pool entry for the data item,
   wherein said constant pool entry includes an unresolved value field for maintaining the unresolved value and a resolved value field for maintaining the resolved value of the data item.

10. The system of claim 9, wherein the constant pool further includes a resolution flag for each data item, wherein said flag is set after that data item has been resolved.

11. The system of claim 10, wherein a data item within a constant pool has as its unresolved value an index to the name of a class, and said system further includes means for accessing said unresolved value to obtain the class name, irrespective of whether said resolution flag has been set.

12. The system of claim 9, wherein the means for performing a resolution for a data item comprises:
    means for retrieving the unresolved value of the data item;
    means for determining the resolved value of the data item; and
    means for writing the resolved value of the data item into the constant pool entry, whilst still maintaining the unresolved value of the data item in the constant pool entry.

13. The system of claim 12, wherein the retrieving, determining and writing are performed without locking the constant pool or any component thereof.

14. The system of claim 12, wherein the means for performing a resolution for a data item further comprises means for setting a resolution flag for a data item after the resolved value of that data item has been written into the constant pool entry.

15. The system of claim 9, wherein said program classes are loaded into a bytecode environment which includes said constant pool.

16. The system of claim 15, wherein the computer system supports a configuration of shared bytecode environments, such that data items in the constant pool in one bytecode environment can be resolved in response to processing in another bytecode environment.

17. A computer program product comprising program instructions on a medium which when loaded into a computer system having one or more program classes loaded therein will cause the computer to perform a method comprising the steps of:
    providing a constant pool having constant pool entries for storing data items related to a program class;
    performing a resolution on at least some of the data items in the constant pool, said resolution transforming a data item in a constant pool entry from an unresolved value as loaded to a resolved value such that the data item can be utilised by a program; and
    maintaining both the unresolved value and the resolved value in the constant pool entry for the data item,
    wherein the constant pool entry has an unresolved value field for maintaining the unresolved value and a resolved value field for maintaining the resolved value.

18. The computer program product of claim 17, wherein the program instructions further cause the computer to perform the step of setting a resolution flag for a data item after that data item has been resolved.

19. The computer program product of claim 18, wherein a data item within a constant pool has as its unresolved value an index to the name of a class, and said program instructions further cause the computer to perform the step of always accessing said unresolved value to obtain the class name, irrespective of whether said resolution flag has been set.

20. The computer program product of claim 17, wherein the step of performing a resolution for a data item comprises the steps of:
    retrieving the unresolved value of the data item;
    determining the resolved value of the data item; and
    writing the resolved value of the data item into the constant pool, whilst still maintaining the unresolved value of the data item in the constant pool entry.

21. The computer program product of claim 20, wherein the steps of retrieving, determining and writing are performed without locking the constant pool or any component thereof.

22. The computer program product of claim 20, wherein the step of performing a resolution for a data item further comprises the step of setting a resolution flag for a data item after the resolved value of that data item has been written into the constant pool entry.

23. The computer program product of claim 17, wherein said program classes are loaded into a bytecode environment which includes said constant pool.

24. The computer program product of claim 23, wherein the computer system supports a configuration of shared bytecode environments, such that data items in the constant pool in one bytecode environment can be resolved in response to processing in another bytecode environment.

* * * * *